April 9, 1963 F. T. INNES 3,085,132

DIGITAL COMPUTER DATA READ-OUT SYSTEM

Filed Aug. 17, 1960 4 Sheets-Sheet 1

INVENTOR.
FRANK T. INNES
BY
Laurence R. Brown
ATTORNEY

April 9, 1963 F. T. INNES 3,085,132

DIGITAL COMPUTER DATA READ-OUT SYSTEM

Filed Aug. 17, 1960 4 Sheets-Sheet 2

INVENTOR.
FRANK T. INNES
BY
Laurence R. Brown
ATTORNEY

INVENTOR.
FRANK T. INNES
BY
Laurence R. Brown
ATTORNEY

INVENTOR.
FRANK T. INNES
BY Laurence R. Brown
ATTORNEY 3,085,132
Patented Apr. 9, 1963

3,085,132

DIGITAL COMPUTER DATA READ-OUT SYSTEM

Frank T. Innes, Malvern, Pa., assignor, by mesne assignments, to Drexel Dynamics Corporation, Philadelphia, Pa., a corporation of Pennsylvania Filed Aug. 17, 1960, Ser. No. 50,277
10 Claims. (Cl. 178—30)

The present invention relates generally to high-speed digital computer systems, and more particularly to data read-out or output systems for providing recorded data therefrom. The system of the present invention is particularly adapted for deriving data to be recorded from computer-processed magnetic tape or any suitable source of digital data.

One of the present difficulties with high-speed digital computer systems is the inability of the output equipment to provide recorded data at a rate comparable to the speed of the computer. In other words, relatively slow output speed has been a major problem among those handicapping computer capabilities.

It is, therefore, an object of this invention to provide an improved high-speed system for reading out and recording, in graphical or printed form, digital output data from any suitable source, such as computer-processed magnetic tape or an analog-digital conversion system.

The present system is adapted to permit computers to deliver data substantially as rapidly as it can be processed, and it is a further object of this invention to provide effectively a digital computer data read-out system which is capable of operating at speeds which are enough faster than existing digital computer outputs to handle the capabilities of several of the highest-speed computers, and not only provide printed-data or information therefrom, but also plotted data or information independently or simultaneously.

A factor of importance in providing a high-speed data read-out or output system with a computing facility, is extreme reliability. In accordance with the invention, in providing a high degree of reliability, a recording technique is used which involves a D.-C. pulse-responsive multiple-element recorder which electrically marks a moving recording chart or tape or like element and gives a printing rate of as high as four thousand or more lines per minute. By comparison, conventional high-speed printers, which are available for computers, normally operate at speeds as high as six hundred lines per minute, which is much slower than the computer capability for many operations.

As a recorder for use in the system of the present invention, an electrical signal or pulse-responsive multi-element system is at present preferred, which may be of the type having a plurality of duplicate individual markers or stylus elements which act on a constantly-moving processed type or chart in response to applied electrical pulses or voltages, like miniature printers. The markers or stylus elements are evenly spaced and aligned in a single continuous row substantially the full width of the tape or chart, and controlled to establish dynamic or virtual matrices in columns across the chart, with a density which may be as high as 100 per inch with a few over 1,000 marker or stylus elements.

This system also permits the use of effectively duplicate amplifying and control circuits for the individual styli or stylus elements, and fewer control circuits and recording elements than any known system of this type. Because of the particular matrix operation of the single line of styli in accordance with the invention, the amplifying and driving elements therefor may likewise be reduced in number, whereas in recorder-type read-out systems heretofore known and used, several thousands of matrix elements and amplifier means therefor have been required. This makes such equipment relatively costly and complicated.

In the system of the present invention, furthermore, the chart or tape element flows continuously under the line of marker or stylus elements where the record is made and stops only when programmed or at the conclusion of the data. Thus, there are no moving parts, with the exception of the tape or chart and the drive motor and rolls therefor, and no start-stop motion or impact printing to cause added mechanical wear and shorten the operating life of the equipment.

The high-speed digital-computer data readout system of the present invention offers a very wide range of versatility which makes it extremely valuable for preparing any type of computer output data, preferably such output data as derived from computer-processed magnetic tape. The pulse-responsive marker or stylus elements print out on the chart or tape element according to the computer output data coded on the magnetic tape, and the commands of the logic portion of the system, which include decoding and character generation equipment.

It is therefore an object of this invention to provide an improved digital computer read-out system which responds to recorded computer data on magnetic tape or like storage means, and information from associated computer system logic circuits, to print and/or plot on a moving chart or tape, suitable graphs, or any of a plurality of letters, numbers or selected symbols representative of the computer data.

The multiple-stylus recorder, as hereinbefore noted, is preferably of the electronic type, and may include driver units comprising a separate two-stage (D.-C.) or pulse amplifier for each stylus or stylus element. Each individual stylus or element is thus connected with and actuated by its own amplifier circuit and operates independently of all the others in marking the chart or tape.

With the multi-stylus or multi-element programmed recording system in accordance with the invention, the print and plot definition or quality can be very high. The resolution, both in the chart-feed direction, and normal to the chart-feed direction, is presently one one-hundredth of an inch, while requiring only slightly more than one thousand stylus elements for a chart or tape width of ten inches. This degree of definition is highly desirable with high-speed computer data reproduction systems of this type, particularly when it can be attained with such reductions in circuitry and circuit elements as in the present system. At a normal tape or chart speed, this requires an electrical signal of a millisecond, or less, duration to mark an elemental dot or point. Since the coded tape or general information control pulse duration of the overall system is measured in microseconds, delay or storage means is provided in the system for actuating the individual markers or styli in response to such signals.

Having considered the data read-out system generally, and the specific type of multiple-stylus recorder used, further elements of the overall system which facilitate reading out digital computer data from computer-processed magnetic tape may be considered briefly for a better initial understanding of the system. There are several components or elements which may be considered to provide a source of timing and data-representing signal pulses for actuating the recorder. The stylus or marker preamplifier or control means connected between such source and the recorder are made to effectively extend the signal pulses to a degree sufficient for actuating the recorder properly. The main portion of the present system now to be considered is that which provides the source of timing and data-representing signal pulses.

In considering that portion of the system, it must be understood that a portion of any program to be read out and displayed in visible form is stored on the input tape in the form of control characters. In addition, part of the program may be contained in auxiliary apparatus under control of certain tape-stored control characters. The input tape may be assumed to contain seven channels or tracks spaced laterally across the tape. Six of these channels contain data.

Master timing for the system logic is generated by a crystal-controlled oscillator. The clock frequency is related to the recorder tape or chart feed rate. The tape unit is equipped with a photo-sensing device and will read magnetic tape compatible with a standard format at 150 inches per second.

In this system, a printed character is formed by a pattern of dots marked on the traveling tape or chart by the group or line of styli. The styli are divided, by tens, into 100 columns of which as many as seven styli in each column may be used in forming a character. The other three styli, not used for printing, provide the spaces between characters.

Furthermore, in accordance with the invention, tape records consisting of up to 144 characters, are stored temporarily in buffer memory means and, upon command, one record is transferred to a recirculating buffer memory means providing seven channels. In this system, the recirculated information is then applied to the seven operating or printing styli, which are pulsed eleven times as the chart or tape is moving, to create a dynamic or virtual matrix. Pulsing the styli eleven times corresponds to a scanning action, so that the characters being formed on the tape or chart are formed on a trace-at-a-time basis.

In one of the aspects, a system embodying the invention may be considered to comprise; first, a computer-processed magnetic tape signal source; second, program circuits for reorganizing the tape code into a point code, for recording on the moving chart or tape with the recorder, and utilizing intermediate recirculating buffer memory circuits from which information or data is decoded when used; and third, the recorder itself comprises a plurality of individually-actuated or excited stylus elements or point markers in a single row extending transversely of a moving record, and these in turn are controlled by effective stylus or marker control circuits which include "NOR" preamplifier units as effective pulse stretcher means.

In this system, therefore, a minimum amount of data is circulated since it stores only seven bits for every character. Other systems have gone into the decoder with as many as 77 bits for every character. Furthermore, the present system utilizes eleven recirculations per character and thereby effects a 7×11 point matrix with only slightly more than 1,000 styli or markers that occupy a chart width of only ten inches in width.

Broadly considered, the digital-computer read-out system of the present invention provides for economy and simplification over previous known equipments for this purpose. Its virtual or dynamic matrix, with fewer amplifiers and preamplifiers, contributes to this result, as does the timing system for activating all columns at the same time on like markers or stylus elements. In addition there is only one moving part, which is the tape or chart element, and this can be of low-cost processed paper or like material. Finally, there are simplified and effective program circuits for reorganizing the tape code into a point code for recording on the moving chart with the multi-stylus recorder, and including intermediate recirculating buffer memory circuits from which the data is decoded when used.

The invention will, however, be further understood from the following description when considered in connection with the accompanying drawings, and its scope is pointed out in the appended claims.

Figure 1:
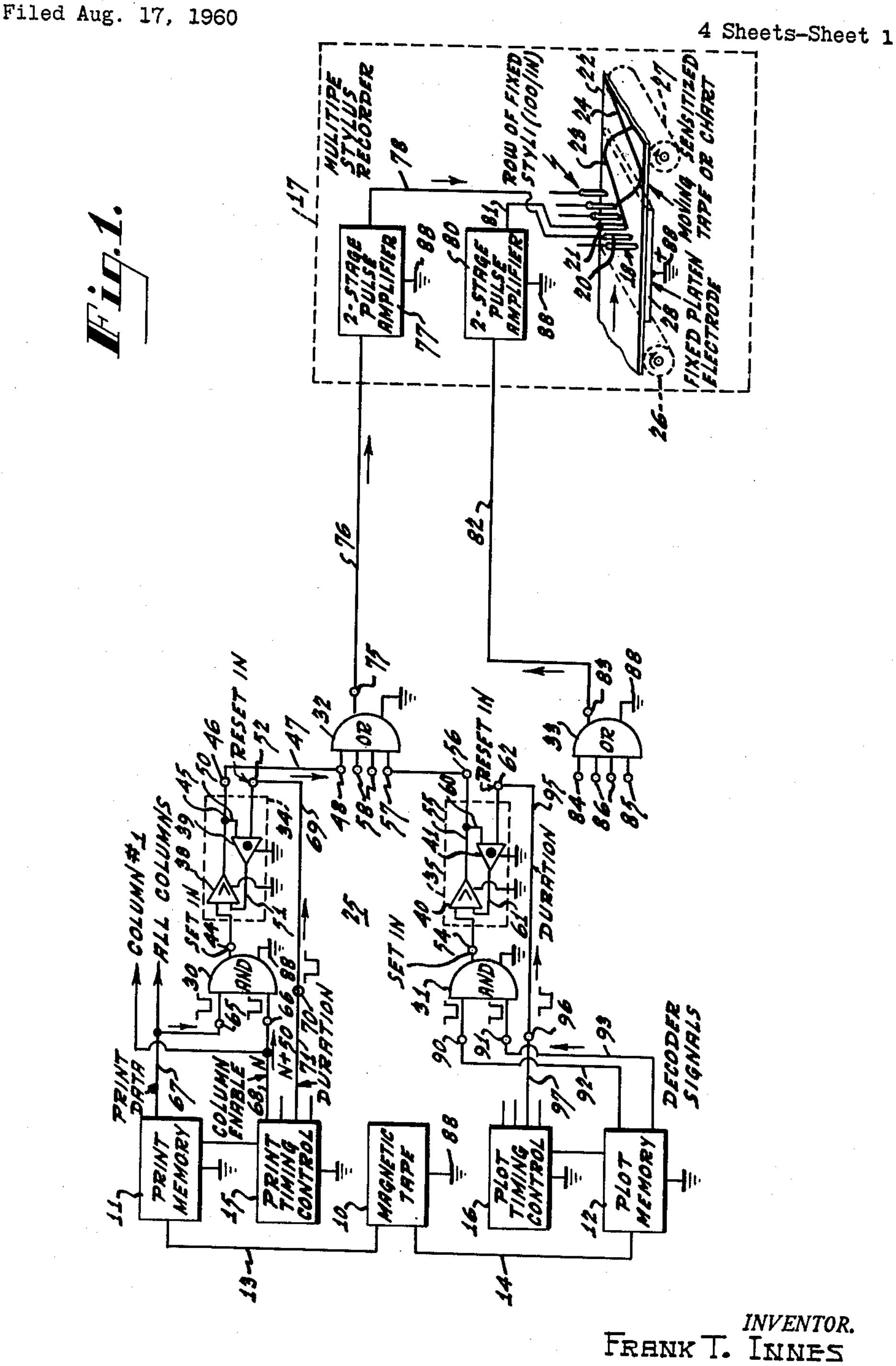
FIGURE 1 is a schematic circuit diagram, partly in block form, of a digital computer data readout system embodying the invention.
Figure 2:
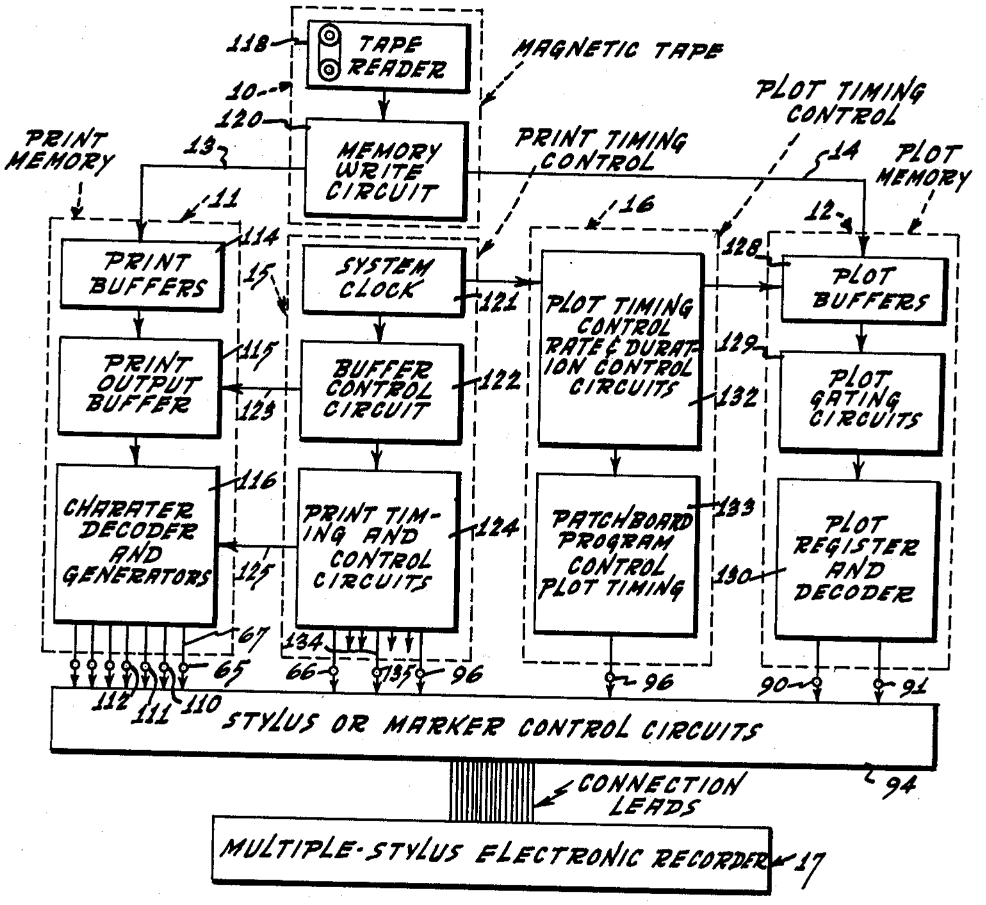
FIGURE 2 is a schematic circuit diagram, in block form, of the digital computer data read-out system of FIGURE 1 rearranged to show further components of the system in accordance with the invention.
Figure 3:
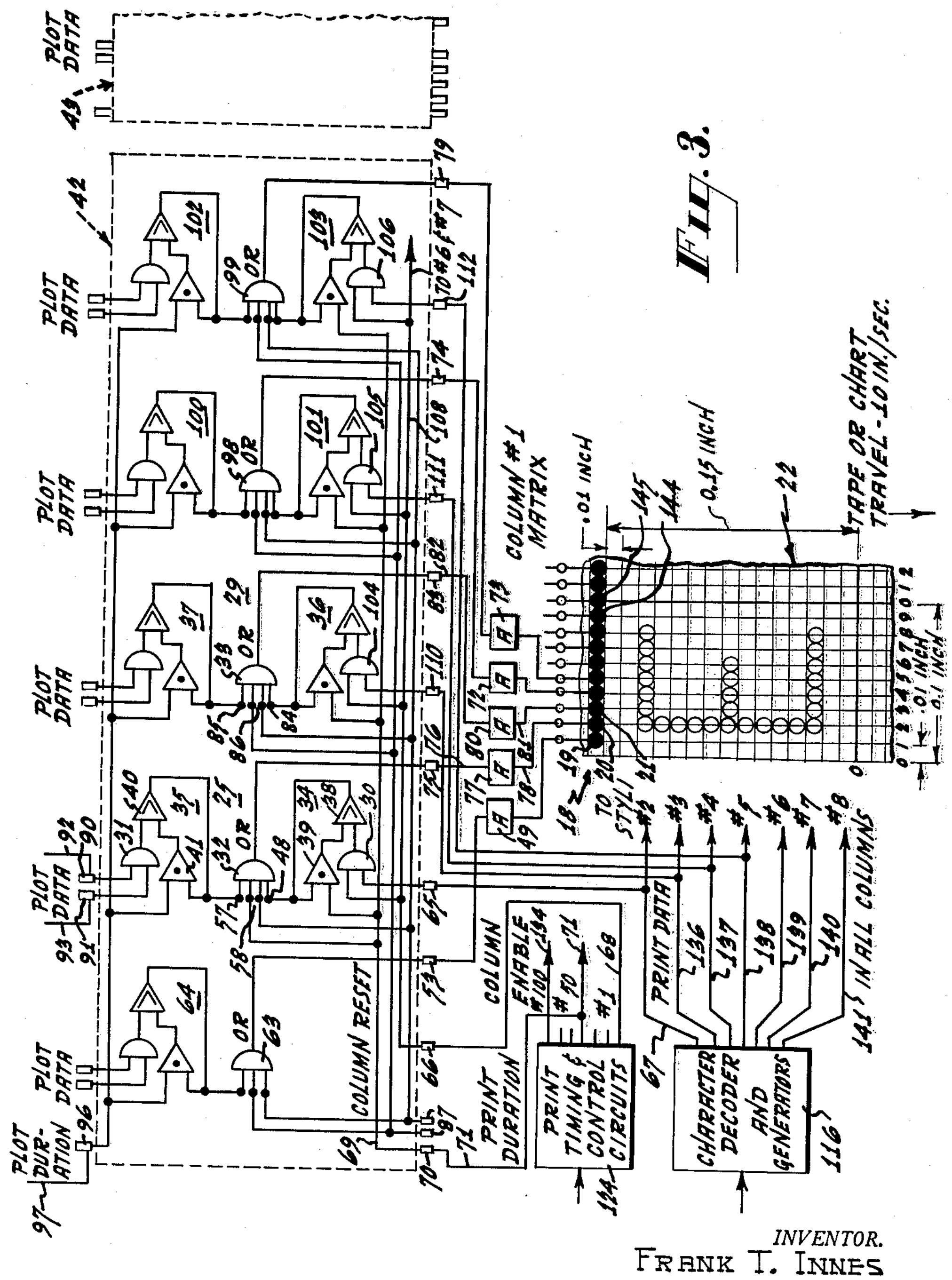
Figure 4:
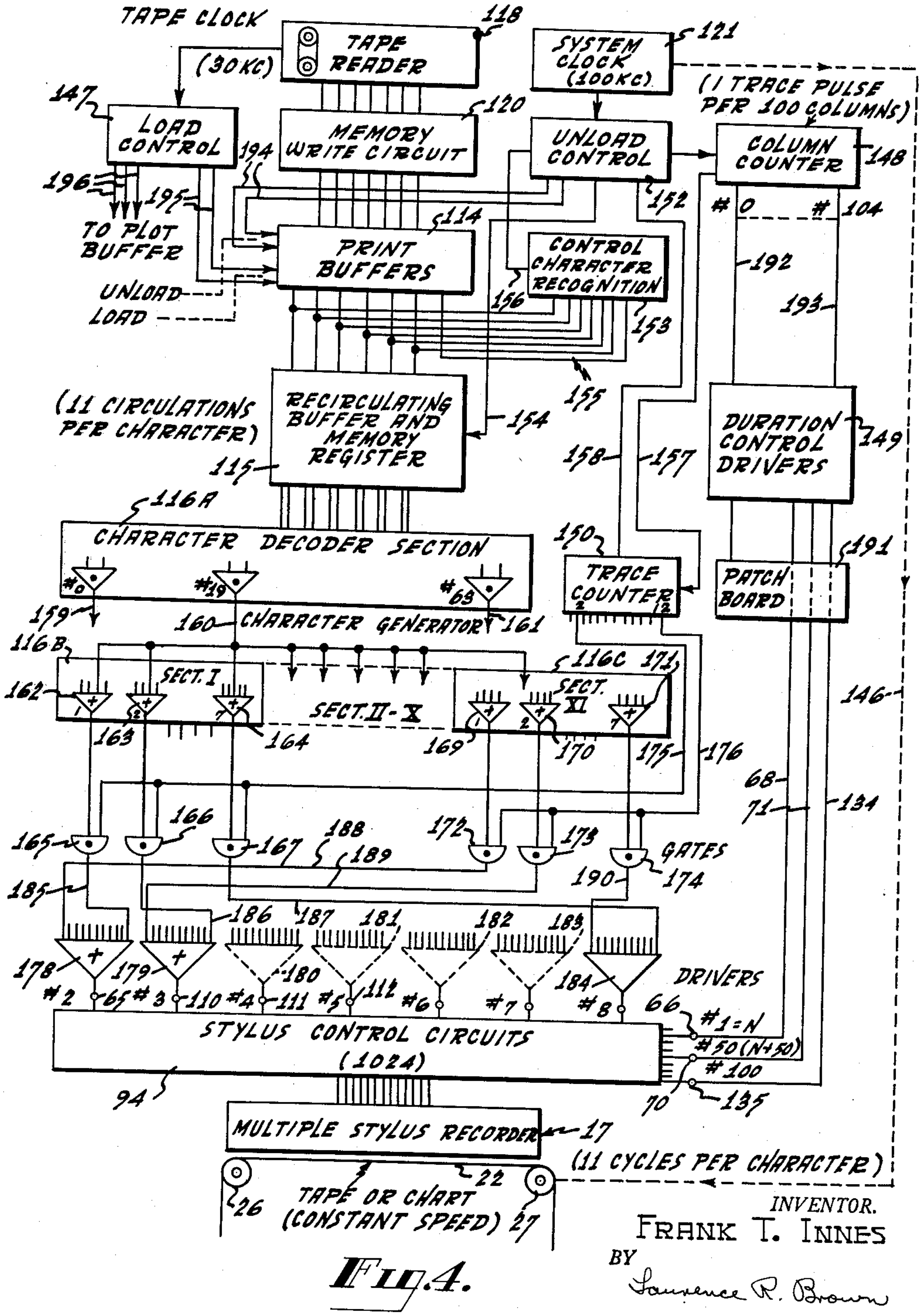

FIGURE 3 is a schematic circuit diagram of a portion of the system of FIGURE 1, showing certain elements in greater detail to illustrate certain salient features of the invention; and FIGURE 4 is a further schematic circuit diagram, partly in block form, of a portion of the data read-out system of FIGURES 1 and 2, rearranged and including further components of the system to illustrate other features and mode of operation.

Referring to the drawings, and referring particularly to FIGURES 1 and 2, the basic machine or operating elements of a high-speed digital-computer data read-out system to which the invention relates, includes a programmed pulse information source, such as magnetic tape means 10 connected, through suitable circuit means 13 and 14, for feeding input data from computer-processed magnetic tape into print and plot buffer memory means 11 and 12 respectively, as indicated. The basic machine elements further include print and plot timing-control means 15 and 16 respectively, for decoding and character generation to produce plots or continuous lines of printing. These elements are connected through control circuits, as will be described, to drive a multiple-stylus recorder 17 with 1,024 fixed marker or stylus elements in a single line or row 18, of which two elements 20 and 21 are individually designated and referred to more specifically hereinafter. These may be considered to be the #2 and #3 markers or styli in the row.

The row of styli are located transversely of and close to the sensitized paper tape or chart 22 which moves at a uniform rate in the direction of the arrow. The styli are selected for processing the chart in response to control signals from the magnetic tape means or information source 10, and operate to provide thereon a series of plotted curves and other computer output data which are represented by the curves 23 and 24 in the present example. The tape or chart is driven by any suitable means such as a pair of drive rolls outlined at 26 and 27. In any case, the chart is caused to move smoothly and uniformly between the marker or stylus elements and a fixed metal print bar or platen electrode 28. The latter may be maintained at a positive potential, as indicated, to supply ions through the paper to the styli for marking the tape or chart.

When the system is in operation, the tape control or transport means 10 functions to maintain a supply of data in the plot and print input buffers 11 and 12 so as to guarantee uninterrupted plotting and printing. The plot and print input buffers are electrically identical and may be conventional magnetic memory units of any well known type. The plot memory or buffer 12 will normally contain control characters and numbers to be plotted. The control characters are decoded and picked off to perform their functions while numbers are assembled, decoded, and delivered through the stylus preamplifier or control system to the pulse-responsive multi-element recorder. To actuate the multiple-stylus recorder for printing or plotting, a short 10 microsecond or like pulse, for example, must be translated into a longer .5 millisecond or like pulse. This is accomplished in the preamplifier or control circuits for each stylus drive as shown, described, and claimed in copending application Serial No. 50,112 for Digital-Computer Data Read-Out System, filed concurrently herewith for the same inventor, and assigned to the same assignee as this application. However, as the overall system functions as the output or recorder means for and as part of the general system of the present invention, it is herein described along with the program circuits therefor which are part of the general system and the present invention.

Referring more particularly to FIGURES 1 and 3, along with FIGURE 2, the recorder styli, such as the styli 20 or 21 for example, are used for printing characters in one hundred columns and/or plotting curves, and for drawing lines on the chart or tape element 22. The stylus preamplifier or control circuits 25 are shown connected between the multiple-stylus recorder 17 and the print and plot memory and timing control elements 11, 12, 15 and 16. The circuit elements 30 and 31 are diode "AND" gates. The circuit elements 32 and 33 are diode "OR" gates. For each "OR" gate there are two "AND" gates connected therewith through two independent "NOR" two-stage stylus or marker preamplifiers 34 and 35, the amplifier 35 being individual to the "AND" gate 30 and the amplifier 35 being individual to the "AND" gate 31. The amplifier 34 includes an "OR" first stage 38 and an "AND" second or feedback stage 39. The amplifier 35 includes an "OR" first stage 40 and an "AND" second or feedback stage 41.

In circuit composition and function, both amplifiers are physically and electrically identical. Hence, they may be part of a modular system for mounting as printed-circuit boards, as indicated by the dotted enclosures 42 and 43 in FIGURE 3, for example. This permits the use of a large number of marker elements and a high degree of chart resolution at relatively low cost. In the present system, it is obvious that there are over one-thousand such stylus preamplifier or control circuits of which five are shown in FIGURE 3.

The "AND" gate 30 is connected through a set-in or input terminal 44 with the first stage 38 of the amplifier 34. The output circuit 45 for the amplifier 34 is connected wtih the first stage 38 and is provided with an output terminal 46. This, in turn, is connected through a lead 47 with one input terminal 48, of four, on the "OR" gate 32. Feedback from the output circuit 45 through the second stage 39 is indicated by the circuit connections 50 and 51. A reset pulse input terminal 52 is provided in connection with the second stage 39.

In a similar manner, the "AND" gate 31 is connected through a set-in or input terminal 54 with the first stage 40 of the amplifier 35, and its output circuit 55, from the first stage 40, is connected with an output terminal 56, in turn connected to a second input terminal 57 on the common "OR" gate 32. Two additional terminals 58 are provided on the "OR" gate 32 for additional direct signal input to the stylus 21 controlled by the amplifier. In the amplifier 35, feedback is taken from the first stage output circuit 55 through the circuits 60 and 61 and the feedback amplifier stage 41 as shown, and a reset-pulse input terminal 62 is provided in connection with the second stage 41 of the amplifier.

The "AND" gate 30 is provided with program signal input terminals 65 and 66, connected respectively with a print-data pulse output circuit 67 for the print memory 11 to all columns, and a column-enable pulse output circuit 68 to the first or column #1 styli from the print timing-control means 15 of the system. The reset-pulse terminal 52 is connected through a lead 69 and a terminal 70 with a duration or timing-pulse supply lead 71 connected with the print timing-control means 15. The circuit 71 provides a delayed pulse with respect to the program pulse delivered through the column-enable circuit 68. In the present example, it may be assumed that if a pulse is delivered to the circuit 68, such as a pulse N, the pulse delivered to the circuit 71 will be $N+50$ signal pulses later. These are the 10 microsecond coded memory or general information control pulses referred to hereinbefore.

The output circuit for the "OR" gate 32 is provided with a terminal 75 which is connected through an output lead 76 with the input side of the two-stage stylus-driver amplifier 77. The amplified pulse for actuating the stylus 20 is applied thereto through an output circuit 78 connected between the stylus 20 and the amplifier 77 as shown.

Like the marker or stylus 20, the marker or stylus 21 and each of the other marker or stylus elements are provided with individual driver means comprising a two-stage amplifier. For example, the stylus 21 is provided with a two-stage amplifier 80 which is connected thereto through an output lead 81. A pulse-input circuit 82 for the amplifier 80 is connected to the output terminal 83 of the "OR" gate 33. This is a duplicate of the gate 32 and is provided with two input terminals 84 and 85 and two auxiliary input terminals 86 corresponding to the terminals 48 and 57 and the terminals 58 respectively of the "OR" gate 32. As shown in FIGURE 3, the input terminals 84 and 85 are connected, like the terminals 48 and 57, with a pair of amplifiers 36 and 37, respectively, in a second stylus preamplifier or control circuit 29, in the same manner and for the same purpose as the preamplifiers 34 and 35 in the control circuit 25.

The other preamplifiers for the remaining styli likewise are not shown completely to simplify the drawing. However, for the first, or #1 marker or stylus and the fourth and fifth, or #4 and #5, markers or styli in the row, driver amplifiers and preamplifiers are shown to complete the circuit structure for the printed circuit board or modular unit 42. For example, a driver amplifier 49 for the first or #1 stylus 19, in the row 18, is connected through an output terminal 53 and an "OR" gate 63, with a preamplifier 64 which receives only plot data. This is because the #1, #9 and #10 marker or stylus elements are not used for printing, thereby to provide spacing between printed characters. The effective matrix which does this will further be described hereinafter.

The driver amplifiers 72 and 73 for the fourth and fifth styli in the row are connected, through output terminals 74 and 79 and respective output "OR" gates 98 and 99, with preamplifiers 100 and 101 for the fourth or #4 stylus, and preamplifiers 102 and 103 for the fifth or #5 stylus, in the row 18. The print preamplifiers 36, 101 and 103, like the preamplifier 34, are provided with input "AND" gates 104, 105 and 106 respectively which are like and operate for the same purpose as the "AND" gate 30 with respect to the stylus 20. All are connected, at one input terminal, to the column-enable input terminal 66 through a common circuit connection lead or bus 108, and at the other input terminals, individually with data or information input terminals 110, 111 and 112 respectively, which correspond to the input terminal 65 for the "AND" input gate 30 for the preamplifier 34.

All of the return circuit connections for the system may be considered to be provided through chassis or common system ground as indicated in the circuit diagram of FIGURE 1 by the numeral 88. For the purpose of simplifying the drawing all such ground connections are not shown or numbered. However, all circuits have common chassis ground or like return-circuit connection means, as is the usual practice with electronic equipment.

The "AND" gate 31 is provided with input terminals 90 and 91 connected respectively with a first signal pulse output circuit 92 from the plot memory 12 and a second signal pulse output circuit 93 from the plot memory 12 for the overall system. The reset pulse terminal 62 is connected through a lead 95 and a terminal 96 with a duration-pulse supply circuit 97 connected with the plot timing control means 16. The circuit 97 provides a delayed pulse with respect to the pulse delivered to the circuit 93. In the present example, it may be assumed, that the pulse signal output circuits 92 and 93 are provided in connection with, and are part of, the decoder means of the system in the plot memory 12, along with the "AND" gate 31. Thus, the circuits 92 and 93 deliver decoder signals to the gate 31 coincidentally to actuate or set the preamplifier 35, and the signal from the circuit 97 resets it in timed sequence thereafter.

The amplifier 34 and the amplifier 35 are each provided with a first stage which is normally cut-off and may be driven into a condition of conduction by coincidental input negative-going pulses through the input terminals 65 and 66. When the amplifier stage 38 is "ON", the stage 39 is "OFF" and remains off until the reset pulse is received through the input terminal 70. Between the initiation of the driving pulse for the stylus and its cut-off time at the output terminal 75 and the circuit 76, the stylus, which is connected therewith through the amplifier system within the recorder, is energized. This time, as noted, is between .5 and 1 millisecond for a recorder of the type described.

The "OR" gate arrangement permits a print signal or a plot signal, or both, to be applied to the stylus, such as the stylus 20, for which the preamplifier or control circuit, such as the control circuit 25, is provided. These stylus preamplifier or control circuits, each comprising two "AND" gates, such as 30 and 31, a common "OR" gate, such as 32, and two "NOR" amplifiers, such as 34 and 35, provide an effective overall stylus or marker control system designated in FIGURE 2 by the block element 94. This includes, in the present example, over one thousand preamplifiers, like 34 and 35 as a unit 25, or one set for each stylus or marker.

It will be seen that a stylus can be energized from either of two sources. That is, if either of its two "NOR" preamplifier elements are set, the stylus controlled thereby will be energized because the output signals are "OR"'ed together, whereas and "AND" gate at the input side of each preamplifier requires two negative-going pulses to occur in coincidence in order to set such preamplifier. Briefly reviewing the operation of the stylus preamplifier or control system, each preamplifier is transistorized and, with PNP type transistors, comprises a negative "OR" type first stage connected end-to-end, in a feedback loop, with a positive "AND" stage to which the reset pulse is applied at the end of each marking pulse for the stylus controlled thereby. Broadly considered, each preamplifier comprises one "NOR" "OR" and one "NOR" "AND" stage connected end-to-end in the feedback loop. This system operates to provide coincidental holding-pulse and signal-pulse-actuated preamplifier circuits that deliver fixed-time-duration output pulses equal to the holding-pulse time, for proper time-duration control of the markers or stylus elements in the recorder. Further description of the specific preamplifiers is not believed to be necessary other than the operation of one unit.

Briefly considering the specific operation of the one preamplifier 34, which is illustrative of all, and referring to the circuits of FIGURES 1 and 3, it is assumed that the preamplifier has been reset, that the input stage 38 is "OFF", and the feedback stage 39 is "ON", because of the last reset pulse. If now, two negative-going pulses arrive in coincidence at the terminals 65 and 66, the resultant negative-going set pulse at the terminal 44 will cause the stage 38 to switch to the "ON" stage. The stage 39 will then switch to the "OFF" stage because both terminals of the positive "AND" stage are then at the required positive potential to so operate. Being coupled to the first stage 38 through the feedback circuit 51, the negative-going voltage fed back will sustain the first stage in the "ON" condition as the set pulse ends and the set in level returns to a positive value. The output or marking pulse is applied to the stylus 20 through the output circuit 47 and the "OR" gate 32. Cutoff of the pulse occurs when the reset pulse is applied to the terminal 52 to restore the stage 39 to the "ON" condition, whereupon the input stage 38 will be reset to the "OFF" condition.

Referring now more particularly to FIGURE 2 along with FIGURE 1, the major elements of the programming circuits as outlined in FIGURE 1 will now be considered. The print memory 11 may be considered to include print buffers 114, a print output buffer 115 of the recirculating type as hereinafter described, and the character decoder and generators 116. The magnetic-tape section 10 includes a tape transport or reader 118 and a memory-write circuit 120 connected with the tape reader and with the print and plot memory elements through the output circuits 13 and 14. The print buffer 114 is connected to the print output buffer 115 and this in turn is connected with the character decoder and generators 116, as indicated.

The print timing control section 15 includes the system clock 121 which may be a fixed-frequency oscillator or timing pulse generator for the system, a buffer control circuit 122 connected with the clock and with the print output buffer 115 through a control circuit connection 123, and print timing and control circuits 124 which are connected with the buffer control circuit 122 and with the character decoder and generators 116 through control circuit connections 125.

On the plot memory and plot timing control side of the system, it will be seen that the plot memory position 12, like the print memory portion, includes plot signal input buffers 128 in turn connected through plot-gating circuits 129 with the plot register and decoder 130 of the system. The drive or control connection between the plot buffers 128 and the memory write circuit is provided through the circuit connection 14 as hereinbefore mentioned. The plot timing control portion 16 of the system includes rate and duration control circuits 132 and program control means 133 which may be additional elements for changing the plot timing and including a patch board for program control.

It will be noted that the plot register and decoder, as part of the plot memory portion 12 are connected into stylus or marker control circuits 94 through the terminals 90 and 91 in FIGURE 2 which correspond to the like terminals in FIGURES 1 and 3, thereby to indicate the operation of the system without complicating the drawing. Likewise, the plot timing-control portion 16 is similarly provided with circuit connections from the rate and duration control circuits through the patch board control to the terminal 96 for the stylus or marker control circuits 94 as in FIGURES 1 and 3.

Considering now the corresponding connections for the stylus or marker control circuits 94 with the print memory and the print timing control portions 11 and 15, of the system, it will be seen that the terminals 66 and 70 for the stylus or marker control circuits 94 are connected with the print timing and control circuits 124, as in FIGURES 1 and 3. As indicated in FIGURE 3, to which attention is now directed along with FIGURES 1 and 2, it will be seen that the terminals 66 and 70 are connected to the data supply leads 68 and 71 for columns #1 and #50 respectively, and a third data supply lead 134 for column #100 is connected with a terminal 135 on the stylus or marker control circuits 94 in FIGURE 2. These connections will further be considered hereinafter.

It will be noted that the character decoder and generators 116 include the output lead 67 connected with the terminal 65 to indicate the data supply arrangement for the stylus or marker control circuits 94. As hereinbefore described, the specific connection provides print data to the second stylus element in the row 18, that is, the stylus 20. Data supply leads, 136–141 inclusive (FIGURE 3) for the other operative stylus elements in the first column, that is, for the stylus element 21 which is the third stylus, and for the fourth, fifth, sixth, seventh and eighth stylus elements, with the character decoder and generators 116 are likewise indicated. It will be noted that each of these data supply leads extends to all columns that is, all of the 100 columns, one column of which is represented (in FIGURE 3) by the row of ten styli or marker elements extending across the chart or record 22 as part of the single line of over 1000.

It will further be noted that the data supply leads 136, 137, and 138 in FIGURE 3 are connected respectively with terminals 110, 111, and 112 for actuating the corresponding stylus elements in the first column through amplifier means which are mounted on the first unit or board 42. Other preamplifier or control circuits for the first column stylus elements through the second board 43 are not shown in order to simplify the drawing. It should be understood, however, that character or data signals from the character decoder and generators 116 through the circuits 139, 140 and 141 are likewise applied to the sixth, seventh and eighth styli in the first column shown in FIGURE 3 and to the corresponding styli in all of the other columns in parallel, as indicated by the legend in FIGURE 3 "To Styli in All Columns." The additional duplicate circuitry is not shown to simplify the drawing and make the circuits easier to read.

With regard to the specific plot mode of operation, as outlined in FIGURES 1 and 2, it may be said that binary coded tape data are reduced to discrete points on the tape in the plot mode of operation. Tape-stored control characters from the tape reader provide format devices such as grid lines and annotations to the plot, while a plurality of plots are executed simultaneously. In the plot mode the tape-stored control characters may be represented by the binary-coded tape data for drawing horizontal and vertical lines and the like.

The plot register contains ten binary bits in order to represent the total number of stylus elements which, in the present example, is 1024. The first five bits are decoded to provide thirty-two discrete plot point output signals or pulses. The remaining five bits are decoded identically to provide thirty-two plot group output pulses. Thirty-two groups of thirty-two points each provide the 1024 points. A group output signal enables thirty-two control circuits. A stylus control circuit is set by the coincidence of a point pulse and a group pulse as at the terminals 90 and 91 in the circuits of FIGURES 1 and 2. The marking operation of the stylus is then in accordance with the previous description of the stylus control circuits. As the plot mode portion of the system in detail does not concern the present invention, further description thereof is not believed to be necessary.

A print character, as hereinbefore noted, is formed by a pattern of dots marked on the chart or tape 22 by the group of 1024 styli or marker elements arranged in a single row 18 as indicated in FIGURE 3. The styli or markers are divided by tens into 100 columns of which as many as seven styli or markers in each column may be used in forming a character. These are the second, third, fourth, fifth, sixth, seventh and eighth styli or markers, of which the styli 20 and 21 are the second and third. Also, for reference at the opposite side of column #1, the ninth and tenth are indicated by the numerals 144 and 145 respectively. Therefore, the second to the eighth stylus elements, in any column, are the active elements in the printing mode while the #1, #9, and #10 styli, such as stylus elements 19, 144 and 145 in the first column, as shown in FIGURE 3, are not used in order to leave a space between characters. This places the characters in the columns three elements apart as standard spacing. In the present example, with a tape or chart travel of ten inches per second and styli spaced .01″ as shown, the matrix spacing is .01″ in either direction. Thus a 7×11 point matrix as represented by the letter "E" on the chart 22, occupies a total of 10×15 spaces or a width of .01″ and a height of .015″ as indicated in FIGURE 3.

Referring now to FIGURE 4 in particular, along with FIGURE 3 and the preceding figures, the program circuits and particularly the print-timing and control circuits, and the character decoder and generators, are shown in further detail. The print output buffer 115 is effectively a recirculating buffer and memory register, as indicated by the full legend in FIGURE 4, which provides for eleven cycles or circulations per character. Tape records from the tape reader and the memory write circuit are stored in the print buffers or memory 114. Upon command, one record is transferred to the recirculating buffer and memory register 115 and the total number of characters coincides with the number of columns.

Master timing for the system logic is generated by the system clock 121 which is a 100 kc. crystal-controlled oscillator or pulse generator. The base frequency is divided to provide various timing pulses at different rates. The clock system is effectively a train of pulses whose frequency is determined by the recorder tape or chart speed. At ten inches per second the clock rate is 100 kc., and correspondingly at five inches per second the clock rate is 50 kc. The synchronization of the clock with the chart speed is indicated by the dotted connection 146 in FIGURE 3, which means that the tape or chart moves .01″ to advance the markers one row along the chart. Thus the matrix points has the spacing in both directions of .01″, that is, in the direction of tape travel and transversely thereto.

The print timing and control circuits 124 of FIGURE 2 include column-counter circuits and elements indicated by the block 148, duration control drivers indicated by the block 149, and a trace counter system indicated by the block 150. The buffer control circuit 122 of FIGURE 2 is represented in FIGURE 4 by the unload control circuits 152 and the control character recognition circuits 153. The character decoder and generators 116 of FIGURE 2 include a character decoder section 116A and character generators 116B and 116C representing the first and last of eleven sections of the generator, that is, sections I and XI. The print buffers are loaded and unloaded under control of load control circuits 147 and unload control circuits 152 as will be considered hereinafter.

The recirculating buffer and memory means 115 provides seven channels and eleven recirculations per character. The recirculated information is applied to the seven operating or printing stylus elements which are pulsed eleven times as the chart or tape moves at a constant rate in timed relation to the system clock frequency to create the dynamic or virtual matrix represented in FIGURE 3. Pulsing the stylus elements eleven times provides a scanning action so that the characters, such as the character "E", are formed on the tape or chart on a trace-at-a-time basis.

Each time the recirculating buffer and memory register 115 is interrogated, a six-bit coded group is read out into a self-contained static register and decoding matrix where the alpha-numeric equivalent is determined. The same pulse that interrogates the recirculating buffer and memory register advances the column counter 148 so that the first character may be written in the first column and the second character may be written in the second column, etc. This control action is indicated by the circuit interconnections from the clock system 121 to the unload control circuits 152, and from the unload control circuits to the recirculating buffer memory register 115. Control action is taken by way of direct control connections indicated at 154 and indirect feedback control connections 155 and 156 through the control character recognition circuits 153. The column-counter circuits 148 are also connected with the unload-control circuits 152 and both are connected, by means of suitable control circuits 157 and 158, with the trace counter 150 to provide timing and sequence of operations to produce the matrix with one row of stylus elements.

The actual size of the matrix, indicated in FIGURE 3, is 10×15 points. The active portion thereof is a 7×11 point matrix. As described hereinbefore, due to the fact that the tape or chart moves at a constant speed and the clock system is related thereto in such a manner that the point spacing is the same in both the tape travel direction and transversely thereof, the seven active stylus elements may be pulsed eleven times in predetermined relation as the chart moves to create the desired characters. The program circuits reorganize the tape code into a point code for recording on the moving chart with the recorder. The intermediate recirculating buffer and memory circuits are provided as a source from which information is decoded when used. It is the function of the trace counter 150 to inform the recirculating buffer memory that the last trace is complete and that the recirculation of data should cease. It is thus important to note that there is no decoding until the data is used. This mode of operation permits the system to be greatly simplified.

Continuing with basic reference to the circuit of FIGURE 4 along with the preceding figures, the binary-coded characters stored in the recirculating buffer and memory register 115 are decoded into one of sixty-four discrete output pulses, as indicated by the character decoder section 116A, wherein the output leads 159, 160, and 161 are shown for the #0, #19 and #63 signal pulse output circuits respectively. The output connections for the circuit 160 with the character generators outlined in FIGURE 4 is shown in connection with three of the seven amplifier elements of section I thereof, that is, the section 116B. Examples of the sixty-four alphanumeric equivalents of the character output may be indicated as follows: A binary code 110 001 for the character or letter A, a binary code 110 010 for the character of letter B, a binary code 110 011 for the character or letter C, etc.

Each section of the character generator, of which there are eleven sections, as indicated, has seven negative mixers or negative "OR" gates. Three of these for the first, second and seventh of the printing stylus elements (#2, #3 and #8 in FIGURE 3) are shown at 162, 163 and 164 respectively, each connected with the output circuit 160 from the character decoder section and each provided with an output control gate. Representative control gates for the negative mixers of section I are those for the negative mixers 162, 163 and 164 and shown respectively at 165, 166 and 167.

The seven corresponding negative mixers in the eleventh section of the character generator, that is, the section 116C, are represented by the #1, #2 and #7 mixers or negative "OR" gates designated at 169, 170 and 171 respectively. The mixers 169, 170 and 171, as representative of all seven mixers, are provided respectively with output control gates 172, 173 and 174. These gates are under control of the trace counter 150 as will hereinafter be described.

Each of the mixers in the character generators may have up to sixty-four input circuits corresponding to the sixty-four output circuits of the character decoder section 116A although generally few have more than thirty. In FIGURE 4, the character generator is shown set up to form the letter "T" in the matrix of FIGURE 3 by having energized one input circuit to every mixer in the first section and one input circuit to the fourth mixer in each of the other ten sections. All character generator sections to be energized in forming a given character are energized simultaneously. However, only one section is read out at a time. When the trace counter 150 advances to the second trace, the first section of the character generator is read out by the negative "AND" gates associated with the first section. These are the seven gates represented by the gates 165, 166 and 167 and are under control of the trace counter through a control lead 175. This is for trace #2 as indicated. Likewise, the gates 172, 173 and 174 are under control of the trace counter 150 through a control connection 176. This is for the trace #12, as indicated. All of the other gates are inhibited when trace #2 actuates the gates for the first section of the generator.

The corresponding output signals of each character generator section are mixed through the drivers for all columns representing all seven styli or stylus elements, that is, the stylus elements #2–#8, which are the active stylus elements. These drivers which are driver amplifiers, are indicated in FIGURE 4 at 178–184 inclusive. It will be noted that the drivers 178, 179, 180 and 181 are connected with the terminals 65, 110, 111 and 112 respectively, for the stylus control circuits 94 and operate as hereinbefore described to control these stylus elements.

It will be noted that output circuits 185, 186 and 187 for the gates 165, 166 and 167 respectively are connected with the drivers 178, 179 and 184 at the #1 input thereof. Likewise output circuits 188, 189 and 190 for the gates 172, 173 and 174 respectively are connected with the drivers 178, 179 and 184 respectively at the eleventh input terminal thereof. In other words, each character generator section is mixed by the eleven input "OR" circuit in the drivers 178–184. The first output pulse of all sections is mixed in the first driver, the second output pulse of all sections is mixed in the second driver, etc. The driver output signals at the terminals connected with the active stylus elements or the control circuits therefor, always represent the output pulses of the selected character generator section because the input connections to any given driver are mutually exclusive.

For the example cited above, that is, with reference to printing the letter "T," all seven of the active drivers are energized during the first section read-out and these drivers present the information to the seven stylus control circuits in every column, but only the seven active styli in column #1 (see FIGURE 3) will be enabled by the column counter 148.

The column counter 148 is in step with the recirculation buffer and memory register 115 through the unload control circuits 152, so that as the second address is read out, the column count advances to two and the top of the second character is set up in the styli control circuits associated with column 2. During trace #3 from the trace counter, and the remaining traces to trace #12, the fourth driver is energized each time the first recirculating buffer and memory register address is read out, and the information is presented to the fourth stylus control circuit in all columns. Data is recirculated in the recirculating "AND" memory register eleven times, each successive time resulting in another printed trace for each of the characters in the stored record. This means that the #5 stylus, controlled by the amplifier 73 and the preamplifier circuits 102, 103 successively prints for the eleven traces to form the leg or stem of the letter "T" after the first print by all seven active styli for the top of the "T" for the first trace. This stylus, as indicated by the circuits of FIGURE 3, receives its control from the print data supply lead 138 and the terminal 112 of the character decoder and generator section as above described.

The column counter 148 delivers control pulses to the stylus control circuits 94 through a control circuit for each of the 100 columns, of which columns #1, #50 and #100 are represented by the circuits 68, 71 and 134 respectively leading from the duration control circuits or drivers 149. The latter are under control of the column counter directly through circuit connections providing #0 to #104 individual control pulses and indicated by the two of the circuit connections 191 and 192 in FIGURE 4.

Broadly it may be considered that a duration control circuit may be a 3-input "NOR" circuit, that is, it performs the logical functions of "AND" and inversion. Column decoding acts for two of the three inputs to a duration control circuit. The third input may be any format or like information supplied through a patchboard arrangement indicated by the block 191 in FIGURE 4. Since this does not concern the operation of the system in accordance with the present invention directly, except to indicate that all column-enable pulses are routed through the patch board as indicated, it is sufficient to say that the column counter is reset after the count reaches 104 or within two microseconds after the count reaches that figure.

The primary function of the trace-counter 150 is to generate eleven negative-going timing pulses, as outlined by the leads 175 and 176, to sequentially scan the eleven sections of the character generator 116. The trace count is advanced by one count each time the column-counter 148 reaches 104.

The conclusion of column #103 in trace 1, initiates the buffer unload gate or control 152 which allows control pulses through the control connections 154 and 193 from the system clock 121 to gate out the contents of the recirculating buffer and memory register 115. The load control 147 is connected with the tape reader and is responsive to the tape-clock frequency of 30 kc. to load both the print buffers and the plot buffers, the former being connected through the control leads 194 and the latter through control leads 195.

The stylus control circuits 94 require the simultaneous presence of a data pulse from the character generators through the drivers 178–184 and a column enable-pulse N from the duration-control drivers 149 for operation of the respective stylus elements, as described. The marker or reset pulse is delivered at the N+50 column time. Thus a stylus control circuit remains set for a period equal to 50 column counts or .5 millisecond. This double-function arrangement for utilizing a column-enable pulse as a reset pulse further simplifies the equipment required, and is a desirable feature of the system.

The system is set up around the dynamic matrix for each column, each of which may be considered to be a 7×11 point matrix. In ordinary practice this would require at least 77×100 or 7,700 styli or markers, whereas the present dynamic matrix uses only a total of 1,024 styli or markers, and the comparatively few amplifiers, preamplifiers, and gates that go with them. The virtual or dynamic matrix of seven styli are pulsed eleven times.

To do this effectively, the seven-channel recirculating buffer memory section 115, providing eleven recirculations per character, is set up for receiving data from the tape or tape reader 118. Program control circuits and control means, as outlined in FIGURES 2 and 3 and shown in FIGURE 4, are provided in connection therewith for aligning the memory section data or information for application to the markers or stylus elements in the recorder 17 to define characters on the chart or tape 22. With this, means including the system clock and tape clock are provided for circulating the data at the proper speed to correspond to the scanning of the chart or matrix. The chart or tape is moved at such a rate, such as 10 inches per second, that it represents eleven cycles per character in the buffer memory means and provides the trace-at-a-time scan for the simplified matrix.

The synchronized operation of the clock system with the tape or chart and the buffers can be established because the tape or chart, as the only moving part, operates at a constant speed with no start-stop action, or stamping, step-by-step, or like action, and the marking or printing of the chart is done by electric-current flowing from a common electrode or bar into selected stylus elements or markers in the single fixed row. In moving, the tape or chart is accurately timed to provide the 11 point height corresponding to the 7 point width of each character, which, as has been seen, may conveniently be .01 inch, for each point in either direction.

Furthermore, in accordance with the invention, it has been seen that all columns receive signal data at the same time. For example, all like-numbered markers of stylus elements in the one-hundred columns are energized simultaneously with the applied data. However, the different columns are separately enabled by the timing circuits so that the characters are formed under proper control and progressively across the tape from the computer-processed magnetic tape signal source.

As has been seen, particularly with reference to the circuits of FIGURES 3 and 4, this control arrangement economizes on the circuitry and equipment required to establish the dynamic matrix in all one hundred of the columns. With this system the print data or characters provided by the character generator are gated out to all columns while the duration control drivers apply the enabling and subsequent reset pulse to the individual columns. In other words, data is supplied to like stylus elements in all columns, and the enabling and cutoff pulses are supplied to the individual columns selectively, thereby simplifying the circuitry and equipment required.

It can thus be seen, from the foregoing description, that the high-speed digital-computer data read-out system of the present invention facilitates the transformation of computer output data such as that derived from computer-processed magnetic tape, into immediately visible and usable form. The pulse-responsive marker elements print out on the chart or tape element according to the computer output data coded on the magnetic tape and processed through the logic portions of the system which include the character decoding and generation circuits.

The digital-computer data read-out system of the present invention provides for economy and simplification over conventional equipments for this purpose. The virtual or dynamic matrix, with fewer amplifiers, preamplifiers and circuitry contributes to this result, as does the timing system above considered. As pointed out hereinbefore, there is the further advantage that the system has only one moving part, which is the tape or chart element, and this can be of low-cost processed paper or like material. The simplified and effective program circuits for reorganizing the tape code into a point code for recording on the moving tape or chart includes the recirculating buffer circuits from which data is decoded only when used. Thus the decoding operation occurs only when the data is required and it has been shown how this materially contributes to the simplification of the system. The system of the present invention is thus adapted for deriving data to be recorded from computer-processed magnetic tape or like storage medium at a rate comparable to the speed of the modern computer, as is desirable.

Having described the invention, what is claimed is:

1. A digital-computer data read-out system comprising in combination, a computer-processed magnetic-tape signal source including a tape reader, program circuits connected with the tape reader for reorganizing a tape code into a point code for recording and including intermediate recirculating buffer memory means from which information or data is decoded when used, an electronic recorder comprising a plurality of individually actuated marker elements in a single row extending transversely of a moving tape record, and individual marker control circuits for the marker elements of said recorder connected with said program circuits and including "NOR" amplifier units as effective pulse stretcher means.

2. A digital-computer data read-out system comprising in combination, means including a tape reader providing a computer-processed magnetic-tape signal source, an electric-signal recorder having a plurality of individual marker elements, said marker elements being responsive to applied control voltage pulses for marking a moving recording chart and aligned in a single row transversely of said chart, control means for each recorder marker element including a circuit connected for applying control voltage pulses thereto, program circuits connected with the tape reader for deriving control voltage pulses for marking said chart in accordance with the computer-processed data thereon to provide a graphic record thereof on the chart, said program circuits including means for recirculating said data in a plurality of channels a plurality of times to pulse the marker elements in a scanning action in timed relation to movement of the chart and effect a dynamic matrix operation of said marker elements in a plurality of columns across said chart.

3. A digital-computer data read-out system comprising in combination, means including a tape reader providing computer-processed data and timing pulse signals, an electric signal recorder having marker elements responsive to applied signal pulses for marking a recording chart therein, signal pulse-responsive means connected for applying marking pulses to said recorder, and means connected for applying data and timing pulse signals to said pulse-responsive means in predetermined sequence, said last-named means including a multi-channel recirculating buffer memory section providing a plurality of recirculations per character and connected for receiving data from the tape reader, means for aligning the data in the memory section for application to the marker elements to define a character, and means for circulating the data at a speed corresponding to the scanning of the chart to provide a virtual matrix for each character.

4. A digital computer data read-out system comprising in combination, means providing computer-processed data and timing pulse signals, said means including a tape reader; an electric signal recorder having marker elements responsive to applied signal pulses for marking a recording chart therein; signal pulse-responsive control circuits connected for applying marking pulses to said recorder; and program circuits connected for applying data and timing pulse signals to said pulse-responsive means in predetermined sequence; said program circuits including system clock and timing control means, a multi-channel recirculating buffer memory section providing a plurality of recirculations per character and connected for receiving data from the tape reader, means for aligning the data in the memory section for application to the markers to define characters, said last-named means including a character decoder section connected with said memory section and having a plurality of output circuits, and a character generator having a plurality of sections connected between said output circuits and said recorder control-circuits, and means for circulating the data at a speed corresponding to the scanning of the chart to provide a virtual matrix for each character.

5. A system for deriving and recording data from computer-processed magnetic tape, comprising in combination, an electronic recorder having a plurality of marker elements, a magnetic tape signal source including tape reader means, and program circuits for reorganizing tape code signals into point code signals for recording in visible markings on a moving chart in said recorder, said program circuits including intermediate recirculating buffer memory elements and means for decoding information therefrom as used, said memory elements providing at least a six-channel recirculation of data with eleven recirculations per character and connected for receiving data from said tape reader means, means for aligning the data in the memory section for application to said marker elements to define a character, and means for circulating the data at a predetermined rate to correspond to the scanning of the chart in said recorder.

6. A system as defined in claim 5, wherein timing means are provided for actuating the marker elements of said recorder in a plurality of columns, with like marker elements in each column being actuated simultaneously, and wherein the timing means further includes circuits for actuating all of the marker elements in successive columns in predetermined timed relation.

7. A digital-computer data read-out system, comprising in combination, a source of data signal pulses, a multiple element electronic recorder having a constant-speed moving chart and a single row of marker elements extending transversely across said moving chart, said marker elements being responsive to said signal pulses for applying markings to said chart, pulse amplifier circuits connected with each marker element of said recorder, timing and data supply circuits connected with said data source and with said amplifier circuits to apply simultaneous data and timing control pulses thereto, the data pulses being applied to like markers in all columns and timing control pulses being applied to all markers in each selected column, program circuits for reorganizing the tape code from the data source into a point code for operating said recorder, and means for applying a second timing pulse to the marker elements for a predetermined column and to a preceding column as a reset pulse thereby to cut-off the marking operation.

8. A high-speed digital-computer data read-out system, comprising in combination, means providing a magnetic-tape data source and including a tape reader, a pulse-actuated recorder of the multi-stylus electronic type having individual stylus operating circuits, stylus-control amplifier means for said recorder connected with each of said circuits, means connected for receiving and translating pulse information representing computer-processed data from said source to said stylus-control amplifier means to effectively actuate said recorder, said receiving and translating means including program circuits for reorganizing a tape code into a point code for recoding on a moving chart in said recorder and an intermediate recirculating buffer memory section connected for receiving data from the tape reader, means for aligning data in the memory section for application to the stylus elements in the recorder to define successive characters, and system clock means for effecting circulation of the data at a speed corresponding to the scanning of the chart in said recorder to provide a virtual matrix operation in said recorder for recording on said chart.

9. A data read-out system comprising in combination, means for providing digital data signals, an electric-signal recorder having a plurality of individual marker elements, said marker elements being responsive to applied control voltage pulses for marking a moving recording chart and aligned in a single row transversely of said chart, control means for each recorder marker element including a circuit connected for applying control voltage pulses thereto, program circuits connected with the means for providing digital data signals for deriving control voltage pulses for marking said chart in accordance with the computer-processed data therefrom to provide a graphic record thereof on the chart, said program circuits including means for recirculating said data in a plurality of channels a plurality of times to pulse the marker elements in a scanning action in timed relation to movement of the chart and effect a dynamic matrix operation of said marker elements in a plurality of columns across said chart.

10. A digital computer data read-out system, comprising in combination, a source of data signal pulses, a multiple element electronic recorder having a constant-speed moving chart and a single row of marker elements extending transversely across said moving chart, said marker elements being responsive to said signal pulses for applying markings to said chart, pulse amplifier circuits connected with each marker element of said recorder, timing and data supply circuits connected with said data source and with said amplifier circuits to apply simultaneous data and timing control pulses thereto, the data pulses being applied to like markers in all columns and timing control pulses being applied to all markers in each selected column, and program circuits for reorganizing the code from the data signal pulse source into a point code for operating said recorder.

References Cited in the file of this patent

UNITED STATES PATENTS

| | | |
|---|---|---|
| 1,725,533 | Lee | Aug. 20, 1929 |
| 2,659,652 | Thompson | Nov. 17, 1953 |
| 2,969,730 | Brehm | Jan. 31, 1961 |
| 2,976,801 | Dirks | Mar. 28, 1961 |